United States Patent Office 3,411,868
Patented Nov. 19, 1968

3,411,868
PRODUCTION OF BERYLLIUM FLUORIDE
Simon J. Morana, Hazleton, Pa., assignor to The Beryllium Corporation, Reading, Pa., a corporation of Pennsylvania
No Drawing. Filed Sept. 22, 1965, Ser. No. 489,405
4 Claims. (Cl. 23—15)

ABSTRACT OF THE DISCLOSURE

A method of producing substantially pure beryllium fluoride from sinter leach liquor containing sodium fluoberyllate complex by passing the leach liquor through a cation exchange resin and collecting the effluent which contains essentially beryllium fluoride and hydrogen fluoride in concentrations identical with that of the sinter leach liquid feed material.

---

This invention relates to a new and novel procedure for producing beryllium fluoride.

More particularly, the present invention has for its object to provide a new procedure or method of producing beryllium fluoride from sinter leach liquor.

A further and important object of the invention is to provide a new method for expediting the production of beryllium fluoride from sinter leach liquor as a direct process, which avoids following or carrying out much of the procedure at present employed for extracting beryllium from its principal ore, beryl.

In one of the principal commercially employed processes for extracting beryllium from its principal ore, beryl, use is made of sinter leach liquor. This process is generally known as the fluoride process. In this process, a conventional starting ore is beryl, a beryllium aluminum silicate. The beryllium in the ore is, of course, quite insoluble in water, and it does not react with normal chemicals. The commonly employed process for obtaining beryllium in water-soluble form consists in grinding the beryl ore with sodium fluosilicate and soda ash, $Na_2CO_3$, and heating the mixture to effect reaction and thereby obtaining a product which contains the beryllium in the form of a water-soluble sodium fluoberyllate complex, commonly called sodium beryllium fluoride. The soluble beryllium compound is then water-leached from the insoluble gangue material and the leach water is commonly known as sinter leach liquor.

In the commonly employed procedure, the leach liquor thus obtained is subjected to a number of operations before the desired beryllium fluoride is obtained.

In actual operation, the molar ratio of fluorine to beryllium in the sinter leach liquors is about three rather than four, which is required if the leached product were $Na_2BeF_4$ as is customarily postulated. Thus, beryllium in the leach liquor is present as the fluoride with about an equal molar ratio of sodium fluoride. This would indicate that the product obtained is either a mixture of equal mols of $BeF_2$ and $Na_2BeF_4$, or possibly the compound $NaBeF_3$, which has also been hypothesized in literature.

Because of the presence of large quantities of sodium fluoride associated with the beryllium fluoride leach liquors and because of the inability to date to effectively separate the sodium fluoride from the beryllium fluoride, the industrial processes at present employed for producing beryllium fluoride all involve precipitation of the beryllium fluoride complex with caustic to form insoluble beryllium hydroxide, which is then separated by filtration. Then, in order to convert the beryllium hydroxide back to beryllium fluoride, in which form it is ultimately reduced to beryllium metal with magnesium, fluorine in the form of hydrofluoric acid or ammonium bifluoride must be added.

According to published literature, the Be—F bond linkage has an ionic character of 79 percent. Thus, if a solution of beryllium fluoride were placed in contact with a strong cation type ion exchange resin, it would be expected that the beryllium ion would attach itself to the resin and the effluent would be hydrofluoric acid. Similarly, with sodium fluoride the sodium ion would be captured, resulting in hydrofluoric acid in the effluent liquors.

Contrary to what would be expected, it has been determined experimentally that when beryllium salts such as sodium beryllium fluoride are passed through an ion exchange column in contact with a strong cation type ion exchange resin that the sodium ion of sodium fluoride is replaced with a hydrogen ion, thus resulting in an effluent containing $BeF_2$ and HF in about equimolecular proportions. By this procedure, therefore, the conventional steps of precipitating the leach liquor as hereinabove set forth are avoided and the beryllium fluoride may then be directly reduced to beryllium metal.

In proving the present invention, a number of procedures were followed, using the two resins Amberlite, IR–20, a polystyrene, nuclear sulfonic acid, and Dowex 50W, a styrene divinyl benzene copolymers sulfonic acid.

A stock solution of 10 gallons of plant sinter leach liquor of the following typical analysis was put aside to be used in all subsequent ion exchange tests so as to eliminate the variable of difference in feed liquor. The impurities are reported as p.p.m. on a beryllium metal basis, except for fluorine and sodium, which are reported on a mol fraction basis relative to beryllium.

Composition of sinter leach liquor

| | G./l. |
|---|---|
| BeO | 5.3 |
| F | 13.1 |
| Na | 5.8 |

F/Be mol ratio=3.2 (calculated)
Na/Be mol ratio=1.2 (calculated)
Impurities (calculated on Be basis)

| | P.p.m. | | P.p.m. |
|---|---|---|---|
| Fe | 1000 | Mn | 3500 |
| Al | 700 | Li | 400 |
| Mg | 5000 | Ca | 1500 |
| Ni | 750 | Co | 9 |

A laboratory scale ion exchange column was made from a tube 2.9 cm. I.D. by four feet high with a packing of 3 inches of beads on the bottom. A first series of experiments were then carried out using Amberlite IR–20 in accordance with the following example.

EXAMPLE I

One pound of Amberlite resins was placed on the beads giving the total volume of resins of 484 ml. The recommended flow rate is .1 ml./minute/ml. of resin, or about 48 ml./minute. The rated capacity of these resins at 100 percent efficiency at per liter of resins is 1.9 equivalence of ions such as sodium.

In this example, the resin was used "as received" (in the hydrogen form) with an average throughput of 40 ml./minute, of leach liquor. A total of 2750 ml. of sinter leach liquor containing 3.2 mols of fluorine per mol of Be at a concentration of 5.3 grams BeO per liter were passed through the column containing 1 pound of commercially available acid form strong cation-type exchange resin. The effluent from the column was an acidic sodium-free liquor which contained all of the beryllium and fluorine in the starting leach liquor. The product was a mixture of $BeF_2$ and HF at a concentration of 5.6 grams BeO per liter and a molar ratio of fluorine to beryllium of 3.0. Thus, all of the fluorine and beryllium contained in the sinter leach liquor was recovered in the effluent devoid of sodium at the same concentration as the input feed liquor. Conversion of sodium ions to HF would be expected from the following chemical equation where R stands for resin:

$$NaF + RH = RNa + HF$$

A total of 2750 ml. of sodium-free effluent was obtained as determined by a flame test. The pH of the sodium-free liquor was below 1 and immediately rose to 5.4 when the resins were spent. Thus, a continuing pH control of the effluent liquors is usable or available as a control yardstick for end point.

Following the preceding operation, the ion exchange column was flushed with water; regenerated with three liters of 4 percent HCl at a flow-rate of 22 ml./minute, and again flushed with water to remove free acid from the column. Sinter leach liquor was then passed through the column at an average flow-rate of 35 ml./minute until 2855 ml. of sodium-free effluent was obtained. The resin bed was again regenerated with HCl to return it to the hydrogen form for subsequent experiments.

EXAMPLE II

A similar operation to that set forth in above Example I, or a similar set of operations as above set forth, were conducted in a second column filled with Dowex 50W resins. The wet resin bed of Dowex resins had a volume of 570 ml. A total of 2820 ml. of sodium-free effluent was collected at an average flow-rate of 35 ml./minute with the as-received fresh resins, and 3650 ml. of sodium-free effluent liquor was obtained from the HCl regenerated column at an average flow-rate of 39 ml./minute. As with the first cited example using the Amberlite resins, the effluent liquors had a pH of below 1 and the pH value increased when the resins became saturated. Also the beryllium and fluorine concentration of the effluent liquors were about the same as the in-put sinter leach liquor.

The following tabulation shows the chemistry of the effluent liquors from the exchange columns using the stated resins as received and after HCl regeneration, the impurities being calculated on a Be metal basis.

|  | Amberlite Resin | | Dowex Resin | |
|---|---|---|---|---|
|  | Resin as received | Resin after HCl regeneration | Resin as received | Resin after HCl regeneration |
| Fe | 1,150 | 900 | 550 | 600 |
| Al | 650 | 800 | 500 | 180 |
| Mg | 400 | 430 | 200 | 110 |
| Ni | 75 | 80 | 50 | 80 |
| Mn | <30 | 45 | <30 | 25 |
| Cr | 125 | 170 | 95 | 105 |
| Cd | <1 | <1 | <1 | <1 |
| Li | >400 | >400 | 5 | G>20 |
| Ca | 1,000 | 1,000 | 500 | G>400 |
| Co | <5 | <5 | <5 | <1 |
| Cu | <50 | 70 | 50 | <10 |
| Zn | <100 | <100 | 400 | <40 |
| Ag | 10 | <5 | 10 | 2 |
| Pb | 50 | 100 | 5 | 40 |
| Mo | 50 | 50 | 50 | 20 |
| Na | <200 | <200 | <200 | <200 |
| Effluent Liquors: | | | | |
| BeO, g./l. | 5.6 | 5.7 | 5.5 | 5.7 |
| F, g./l. | 12.9 | 13.3 | 13.5 | 13.3 |
| F/Be mol ratio | 3.0 | 3.1 | 3.2 | 3.1 |
| Starting Liquor: | | | | |
| BeO, g./l. | 5.3 | | | |
| F, g./l. | 13.1 | | | |
| F/Be mol ratio | 3.2 | | | |

Additional experiments were conducted as set forth in the following examples.

EXAMPLE III

The procedure of Example II was repeated using other sinter leach liquors containing as low as 2.3 mols of fluorine per mol of beryllium (richer in free $BeF_2$ content). In each case the resulting acidic effluents were free of sodium and contained all of the beryllium and fluorine values present in the respective starting liquors. Besides removing sodium, other ionizable impurities were likewise reduced; for example, nickel was reduced from 750 p.p.m. on a Be basis to 70 p.p.m. on the same basis. The spent ion exchange resins were regenerated with mineral acids, such as sulfuric or hydrochloric acids and were re-used, yielding the same results.

Because of the reported high degree of ionization of the beryllium to fluorine bond linkage,[1] the above results were wholly unexpected. Since the beryllium ions were collected quantitatively from the strong cation-type ion exchange resins, it is likely that the Be—F bond is in fact a covalent type bond that does not ionize under these conditions. Thus, it is possible to directly utilize the fluorine values present in the sinter leach liquor and convert the beryllium contained therein directly to beryllium fluoride without having to destroy the contained fluorine with caustic and then add the fluorine back as hydrofluoric acid or ammonium bifluoride as is the present commercial practice.

Accordingly, it is evident that by employment of the present invention in the production of beryllium fluoride from sinter leach liquors a considerable cost savings in raw material is possible.

The following tabulation illustrates additional results obtained in passing sinter leach liquor through ion exchange resin columns with varying Na to F ratios, typical starting leach liquor analyses being set forth in which the impurities are calculated as p.p.m. on a Be metal basis.

PRODUCTION LEACH LIQUOR

|  | As received | Amberlite | Dowex |
|---|---|---|---|
| Fe | 1,000 | 1,050 | 550 |
| Al | 700 | 700 | 300 |
| Mg | 5,000 | 400 | 150 |
| Ni | 750 | 80 | 60 |
| Mn | 3,500 | 40 | 25 |
| Cr |  | 150 | 100 |
| Cd |  | <1 | <1 |
| Li |  | >400 | 5 |
| Ca | 1,500 | 1,000 | 500 |
| Co | 9 | <5 | <5 |

Composition of Sinter Leach Liquor:
- BeO, g./l. — 5.3
- F, g./l. — 13.1
- Na, g./l. — 5.8
- F/Be mol ratio — [1] 3.2
- Na/Be mol ratio — [1] 1.2

[1] Calculated.

LAB. LEACH LIQUOR

|  | As received | Amberlite | Dowex |
|---|---|---|---|
| Fe | 950 | 400 | 325 |
| Al | 800 | 550 | 580 |
| Mg | 4,500 | 180 | 90 |
| Ni | 700 | 110 | 30 |
| Mn | 4,000 | 35 | <30 |
| Cr |  | 300 | 45 |
| Cd |  |  |  |
| Li |  |  |  |
| Ca | 1,800 |  |  |
| Co | 10 | <5 | <5 |

Composition of Lab. Leach Liquor:
- BeO, g./l. — 7.5
- F, g./l. — 17.7
- Na, g./l. — 7.6
- F/Be mol ratio — [1] 3.1
- Na/Be mol ratio — [1] 1.1

[1] Calculated.

SYNTHETIC LEACH LIQUOR
[Lab. leach and 1 l. $BeF_2$]

|  | As received | Amberlite | Dowex |
|---|---|---|---|
| Fe | 950 | 1,420 | 350 |
| Al | 800 | 450 | 540 |
| Mg | 4,500 | 190 | 60 |
| Ni | 700 | 50 | <30 |
| Mn | 4,000 | 70 | <30 |
| Cr |  | 50 | <30 |
| Cd |  |  |  |
| Li |  |  |  |
| Ca | 1,800 | 1,000 | 300 |
| Co | 10 | <5 | <5 |

[1] L. Pauling, Nature of the Chemical Bond, 2nd edition, p. 74, Cornell University Press, Ithaca, N.Y., 1940.

Composition of Synthetic Leach Liquor:

| | |
|---|---|
| BeO, g./l. | 7.2 |
| F, g./l. | 14.0 |
| Na, g./l. | 3.7 |
| F/Be mol ratio | [1] 2.55 |
| Na/Be mol ratio | [1] .55 |

[1] Calculated.

The synthetic leach liquor designated was composed of one liter of laboratory sinter leach liquor (NaBeF$_3$) plus one liter of beryllium fluoride solution (BeF$_2$).

While in the different examples hereinbefore referred to, reference has been made only to Amberlite IR–20 and Dowex 50–W ion exchange resins, other strongly acidic cation-type ion exchange resins may be employed such as listed below under the trade names and under the indicated type of polymer resin:

| Trade name | Type of polymer resin |
|---|---|
| Duolite C–20 | Polystyrene, nuclear sulfonic acid. |
| Lewatit KS | Phenolic resin, sulfonic acid. |
| Nalco HDR | Styrene and divinyl benzene, sulfonic acid. |
| Permutit Q | Polystyrene, sulfonic acid. |
| Wofatit K | Phenolic resin, sulfonic acid. |

The data hereinabove set forth clearly demonstrates that many of the gross contaminants such as manganese and nickel are effectively absorbed by the cation exchange resin, thereby greatly minimizing subsequent chemical purification operations required to be made for the production of high-purity grade beryllium fluoride. Briefly, it has been determined that all of the fluorine contained in sinter leach liquor is recovered in the sodium-free effluent with the fluorine to beryllium ratio in the proper proportion for making feeder mix, and that the 82 percent column efficiency obtained compares favorably with efficiencies of 60 percent to 80 percent reported on production ion exchange equipment.

The examples further demonstrated that the same column efficiency resulted for both ion exchange resins. However, the Dowex 50–W was apparently slightly more effective than the Amberlite IR–20 in degree of purification achieved in the effluent liquors. Both of these resins were effective in completely removing the sodium ions from solution.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:
1. A process for obtaining substantially pure BeF$_2$ which consists in passing through a strong cation type ion exchange resin in the hydrogen form, sinter leach liquor produced by water extraction of the soluble Be compound formed by reacting ground beryl ore with sodium fluosilicate and soda ash, and collecting effluent consisting essentially of BeF$_2$ and HF.

2. A process for obtaining substantially pure BeF$_2$ which consists in passing through a strong cation-type ion exchange resin in the hydrogen form sinter leach liquor containing a water-soluble sodium fluoberyllate complex and collecting effluent consisting essentially of BeF$_2$ and HF.

3. A process for obtaining substantially pure BeF$_2$ which comprises mixing together ground beryl ore, sodium fluosilicate and soda ash, compacting and sintering the mixture to effect reaction and production of a water-soluble sodium fluoberyllate complex, water-leaching the sinter to extract a soluble complex from the sinter and then passing the sinter leach liquor thus obtained, and without chemical treatment, into and through a strong cation-type ion exchange resin in the hydrogen form and thereby removing sodium and other resin attractable metals and recovering effluent consisting essentially of BeF$_2$ and HF.

4. A process for obtaining substantially pure BeF$_2$ which comprises mixing together ground beryl ore, odium fluosilicate and soda ash, compacting and sintering the mixture to effect reaction and production of water-soluble sodium fluoberyllate complex, water-leaching the sinter to extract the soluble complex from the sinter and then passing the sinter leach liquor thus obtained, and without chemical treatment, into and through an ion exchange column and compacting the liquor with an ion exchange resin selected from the group consisting of polystyrene, nuclear sulfonic acid; styrene divinyl benzene copolymers, sulfonic acid; phenolic resin, sulfonic acid; styrene and divinyl benzene, sulfonic acid; polystyrene sulfonic acid; phenolic resin, sulfonic acid; and recovering effluent consisting essentialy of BeF$_2$ and HF.

References Cited

UNITED STATES PATENTS 3,194,630   7/1965   Glover _____ 23—88

OTHER REFERENCES

Kakihana, "Chemical Abstracts," vol. 46, 1952, p. 3449b. (Copy in Sci. Lib.)

OSCAR R. VERTIZ, *Primary Examiner.*

H. T. CARTER, *Assistant Examiner.*